(12) United States Patent
Hsu et al.

(10) Patent No.: US 10,278,198 B2
(45) Date of Patent: Apr. 30, 2019

(54) PACKET FORWARDING DEVICE, AND PACKET-FORWARDING PRIORITY SETTING CIRCUIT AND METHOD

(71) Applicant: Realtek Singapore PTE LTD, Singapore (SG)

(72) Inventors: Yi-Shou Hsu, Hsinchu (TW); Qian Li, Singapore (SG)

(73) Assignee: REALTEK SINGAPORE PRIVATE LIMITED, Singapore (SG)

( * ) Notice: Subject to any disclaimer, the term of this patent is extended or adjusted under 35 U.S.C. 154(b) by 65 days.

(21) Appl. No.: 15/244,715

(22) Filed: Aug. 23, 2016

(65) Prior Publication Data

US 2018/0063850 A1 Mar. 1, 2018

(51) Int. Cl.
| | | |
|---|---|---|
| *H04W 4/00* | (2018.01) | |
| *H04W 72/10* | (2009.01) | |
| *H04L 12/741* | (2013.01) | |
| *H04L 29/06* | (2006.01) | |
| *H04W 72/12* | (2009.01) | |
| *H04L 12/863* | (2013.01) | |
| *H04W 84/12* | (2009.01) | |

(52) U.S. Cl.
CPC ........... *H04W 72/10* (2013.01); *H04L 45/745* (2013.01); *H04L 69/22* (2013.01); *H04W 72/1263* (2013.01); *H04L 47/50* (2013.01); *H04W 84/12* (2013.01)

(58) Field of Classification Search
CPC . H04W 72/10; H04W 71/1263; H04W 84/12; H04L 45/745; H04L 69/22
See application file for complete search history.

(56) References Cited

U.S. PATENT DOCUMENTS

| | | | |
|---|---|---|---|
| 6,931,017 B2 | 8/2005 | McGowan | |
| 2002/0191614 A1* | 12/2002 | Ido | H03M 7/30 370/394 |
| 2006/0168337 A1 | 7/2006 | Stahl et al. | |
| 2008/0212613 A1* | 9/2008 | Perkinson | H04L 47/10 370/475 |

(Continued)

OTHER PUBLICATIONS

TW Office Action dated Dec. 15, 2017 in Taiwan application (No. 105140132).

(Continued)

*Primary Examiner* — Stephen M D Agosta
(74) *Attorney, Agent, or Firm* — McClure, Qualey & Rodack, LLP (57) ABSTRACT

The present disclosure discloses a packet-forwarding priority setting circuit comprising: a decision circuit configured to detect whether an application type of a packet stream is included in a table; a processing circuit configured to examine at least one preceding packet among the packets of the stream if no application type of the stream is found in the table, so as to determine the application type of the stream and store it in the table, and the processing circuit configured to determine the application type of the stream according to the table if the application type of the stream is found in the table; and a mapping circuit configured to distribute some or all of the packets of the stream to one of a plurality of queues according to the application type of the stream, in which the queues are associated with different priorities respectively.

15 Claims, 4 Drawing Sheets

(56) References Cited

U.S. PATENT DOCUMENTS

| | | | |
|---|---|---|---|
| 2009/0055529 A1 | 2/2009 | Truong et al. | |
| 2009/0154402 A1* | 6/2009 | Esseling | H04L 47/10 370/329 |
| 2010/0008250 A1* | 1/2010 | Nomura | H04L 43/0829 370/252 |
| 2010/0091770 A1* | 4/2010 | Ishikawa | H04L 47/20 370/389 |
| 2010/0232371 A1* | 9/2010 | Jing | H04L 47/14 370/329 |
| 2010/0313267 A1* | 12/2010 | Goldfarb | G06F 17/30985 726/23 |
| 2011/0228781 A1* | 9/2011 | Izenberg | H04L 45/60 370/392 |
| 2014/0201354 A1* | 7/2014 | Matthews | H04L 43/04 709/224 |
| 2015/0215430 A1* | 7/2015 | Votour | H04L 45/00 709/220 |

OTHER PUBLICATIONS

Search Report issued in TW Office Action dated Dec. 15, 2017 in Taiwan application (No. 105140132).

\* cited by examiner

PACKET FORWARDING DEVICE, AND PACKET-FORWARDING PRIORITY SETTING CIRCUIT AND METHOD

BACKGROUND OF THE INVENTION

1. Field of the Invention

The present disclosure relates to packet-forwarding techniques, especially to a packet forwarding device and a packet-forwarding priority setting circuit and method.

2. Description of Related Art

Generally, quality of service (QoS) reflects the overall performance of a communication network, particularly the performance felt by the users of the communication network. QoS can be measured through one or more aspects such as error rate, bit rate, throughput, transmission delay, availability, and jitter.

QoS is a useful and important feature in Wi-Fi transmission. It can be an index for a system/device to make the best use of limited bandwidth and transmitting speed and give users better experience. Unfortunately, although Wi-Fi Multimedia (WMM) certification is brought up to promote the QoS feature, the fact that the priority of a packet stream is usually not classified makes the WMM certification useless in many cases. Therefore this industrial field still looks for a way to implement the QoS feature for those unclassified packet streams.

Currently one way to implement QoS is to manually assign a priority to a specific device in accordance with the IP or MAC address thereof. However, this way is not automatic or not adaptable, and is unworkable for unclassified packet streams. In other words, this kind of prior arts cannot provides universal QoS service for every packet stream.

SUMMARY OF THE INVENTION

In consideration of the problem of the prior art, an object of the present disclosure is to provide a packet forwarding device and a packet-forwarding priority setting circuit and method capable of making improvements over the prior art.

The present disclosure discloses a packet forwarding device. An embodiment of the packet forwarding device comprises a reception circuit, a decision circuit, a processing circuit, a mapping circuit and a transmission circuit. The reception circuit is configured to receive packets of a stream. The decision circuit is configured to detect whether an application type of the stream is included in a table. The processing circuit is configured to examine at least one preceding packet among the packets of the stream after the decision circuit finds that the application type of the stream is not included in the table, so as to determine the application type of the stream and then store the application type of the stream in the table; and the processing circuit is also configured to determine the application type of the stream according to the table after the decision circuit finds that the application type of the stream is included in the table. The mapping circuit is configured to distribute some or all of the packets of the stream to one of a plurality of queues according to the application type of the stream, in which the queues are associated with different priorities respectively. The transmission circuit is configured to output packets in the queues according to the priorities.

The present disclosure also discloses a packet-forwarding priority setting circuit. An embodiment of the packet-forwarding priority setting circuit comprises a decision circuit, a processing circuit and a mapping circuit. The decision circuit is configured to detect whether an application type of a stream is included in a table, in which the stream includes packets. The processing circuit is configured to examine at least one preceding packet among the packets of the stream after the decision circuit finds that the application type of the stream is not included in the table, so as to determine the application type of the stream and then store the application type of the stream in the table; and the processing circuit is also configured to determine the application type of the stream according to the table after the decision circuit finds that the application type of the stream is included in the table. The mapping circuit is configured to distribute some or all of the packets of the stream to one of a plurality of queues according to the application type of the stream, in which the queues are associated with different priorities respectively.

The present disclosure further discloses a packet-forwarding priority setting method. An embodiment of the method comprises the following steps: detecting whether an application type of a stream is included in a table, in which the stream includes packets; examining at least one preceding packet among the packets of the stream when finding that the application type of the stream is not included in the table, so as to determine the application type of the stream and then store the application type of the stream in the table; determining the application type of the stream according to the table when finding that the application type of the stream is included in the table; and distributing some or all of the packets of the stream to one of a plurality of queues according to the application type of the stream, in which the queues are associated with different priorities respectively.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The following description is written by referring to terms acknowledged in this invention filed. If any term is defined in the specification, such term should be explained accordingly.

Each embodiment in the following description includes one or more features; however, this doesn't mean that one carrying out the present invention should make use of all the features of one embodiment at the same time, or should carry out different embodiments separately. In other words, if an implementation derived from one or more of the embodiments is applicable, a person of ordinary skill in the art can selectively make use of some or all of the features in one embodiment or selectively make use of the combination of some or all features in several embodiments to have the implementation come true, so as to increase the flexibility of carrying out the present invention.

Figure 1:
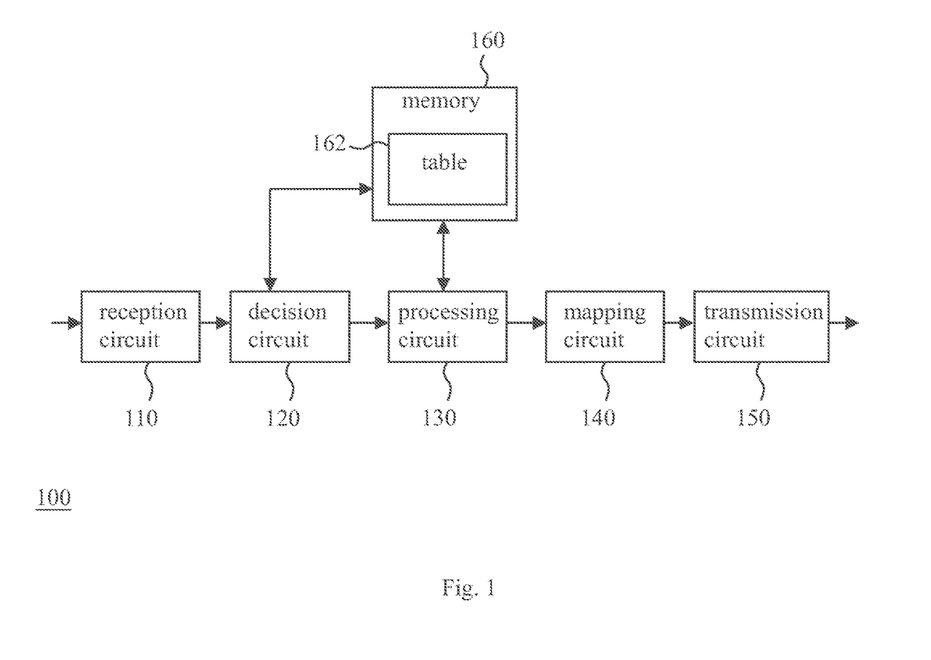
FIG. 1 illustrates an embodiment of the packet forwarding device of the present disclosure.

Please refer to FIG. 1 which illustrates an embodiment of the packet forwarding device of the present disclosure. The packet forwarding device 100 of FIG. 1 is applicable to a network device operable to implement a function of quality of service (QoS). An example of such network device is a wireless router, a wireless gateway, a wireless access point, etc. According to FIG. 1, the packet forwarding device 100 comprises a reception circuit 110, a decision circuit 120, a processing circuit 130, a mapping circuit 140 and a transmission circuit 150, in which each of the reception circuit 110 and the transmission circuit 150 alone is known to those of ordinary skill in the art.

The reception circuit 110 of FIG. 1 is configured to receive packets of a stream (hereafter "packet stream"). In practice, the reception circuit 110, e.g., a multiple-input multiple-output (MIMO) circuit, a single-input multiple-output circuit, a multiple-input single-output circuit or a single-input single-output circuit, is operable to receive different signal streams, and each of the signal streams includes packet signals that can be used to generate the above-mentioned packets of the packet stream. Generally a packet includes one or more header(s), and the information thereof usually includes address and port information such as source address information, source port information, destination address information and destination port information.

The decision circuit 120 of FIG. 1 is configured to detect whether an application type of the packet stream is included in a table 162. A nonrestrictive example of the table 162 is illustrated in Table 1 below, and some reference information such as the Index, the Protocol and/or the title "Packet information" in Table 1 may be neglected when carrying out the present invention. The table 162 is established to include packet information (e.g., header information such as address and port information) of a plurality of streams, and the table 162 could be stored in a memory 160 of the packet forwarding device 100 as shown in FIG. 1, or the table 162 could be stored in a memory (e.g., a system memory of a host) outside the packet forwarding device 100.

the packets in the packet stream. The amount of the preceding packet(s) is decided by how many packets are necessary for the processing circuit 130 to finish the examination.

The mapping circuit 140 of FIG. 1 is configured to distribute some or all of the packets of the packet stream (e.g., all the packets of the packet stream, or all the packets of the packet stream except the at least one preceding packet) to one of a plurality of queues according to the application type of the packet stream, in which the queues are associated with different priorities respectively. For instance, the queues are a queue of VoIP (voice over internet protocol) packets, a queue of HDTV (high definition television) packets, a queue of file download packets, etc., in which the VoIP queue is associated with the highest priority while the file download queue is associated with the lowest priority. It should be noted that packets of different queues could be stored in different buffers (e.g., buffers in the transmission circuit 150) respectively for output; however, this is not a limitation to the present invention.

The transmission circuit 150 of FIG. 1 is configured to output packets in the queues according to the priorities. Generally, the higher the priority, the more the chance of outputting the data in the corresponding queue.

In an exemplary implementation of the above-described embodiment, the packet forwarding device 100 is operable to receive and/or output the packets of the packet stream wirelessly; for instance, the packet forwarding device 100 may receive the packets wirelessly and transmit them through a cable, or receive the packets through the cable and transmit them wirelessly, and so on and so forth. In an exemplary implementation of the embodiment, the decision circuit 120 compares the header information (e.g., address and port information) of the at least one preceding packet with the packet information (e.g., address and port information) in the table to detect whether the application type of the packet stream is included in the table. In an exemplary implementation of the embodiment, the packet forwarding device 100 stores not only the application type of the packet stream but also the header information related to the packet stream in the table 162; however, not all kinds of header information related to the packet stream are required to be included in the table 162. In an exemplary implementation of the embodiment, the queues are respectively associated

TABLE 1

|  |  | Packet information | | | | |
| --- | --- | --- | --- | --- | --- | --- |
| Index | Protocol | Source address | Source port No. | Destination address | Destination port No. | Application |
| 1 | TCP | 157.54.35.39 | 5000 | 206.73.118.180 | 22000 | VoIP call |
| 2 | TCP | 140.16.10.2 | 20 | 206.73.118.180 | 20 | FTP file download |
| ... | ... | ... | ... | ... | ... | ... |

The processing circuit 130 of FIG. 1 is configured to examine at least one preceding packet among the packets of the packet stream after the decision circuit 120 finds that the application type of the packet stream is not included in the table 162, so as to determine the application type of the packet stream and then store the application type of the packet stream in the table 162; and the processing circuit 130 is also configured to determine the application type of the packet stream according to the table 162 after the decision circuit 120 finds that the application type of the packet stream is included in the table 162. The said at least one preceding packet could be the first one or more packet(s) of with Wi-Fi Multimedia's (WMM's) four Access Categories, i.e., four categories of voice, video, best effort and background. In an exemplary implementation of the embodiment, the processing circuit 130 examines the at least one preceding packet according to at least one of follows: at least one predetermined keyword; and at least one predetermined pattern. For example, if the processing circuit 130 examines the at least one preceding packet and thereby finds a pattern of FTP (File Transfer Protocol) such as "220[\x09-\x0d-~] *\x0d\x0aUSER[\x09-\x0d-~]*\x0d\x0a331" in the header and/or data of the at least one preceding packet, the processing circuit 130 will determine that the application type of the packet stream associated with the preceding packet is FTP file download. In an exemplary implementation of the embodiment, some or all of the decision circuit 120, the processing circuit 130 and the mapping circuit 140 are integrated together.

Figure 3:
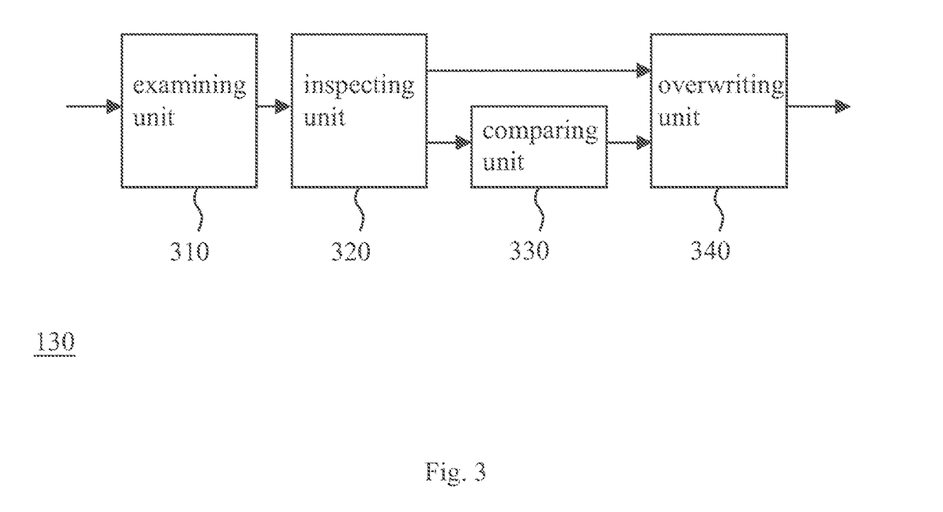
FIG. 3 illustrates an embodiment of the processing circuit of FIG. 1.

In an exemplary implementation of the embodiment, the processing circuit 130 of FIG. 1 overwrites bits of type of service (ToS) of some or all of the packets in the packet stream (e.g., all the packets in the packet stream, or all the packets in the packet stream except the at least one preceding packet) after determining the application type of the packet stream. An embodiment of the processing circuit 130 operable to overwrite the ToS bits is shown in FIG. 3. The processing circuit 130 of FIG. 3 includes an examining unit 310; an inspecting unit 320, a comparing unit 330 and an overwriting unit 340. The examining unit 310 is operable to examine the at least one preceding packet among the packets of the packet stream to determine the application type of the packet stream after the decision circuit 120 finds that the application type of the packet stream is not included in the table 162, and then output the packets of the packet stream to the inspecting unit 320. The examining unit 310 is also operable to output the packets of the packet stream to the inspecting unit 320 without executing examination after the decision circuit 120 finds that the application type of the packet stream is included in the table 162. The inspecting unit 320 is operable to check whether the ToS bits of the packets in the packet stream are already labeled with a non-zero value, and output the packets to the comparing unit 330 if the ToS bits are labeled with a non-zero value or output the packets to the overwriting unit 340 if the ToS bits are not labeled with a non-zero value. The comparing unit 330 is operable to compare the priority of the ToS bits with the priority of the found application type of the packet stream, and then output the packets of the packet stream to the overwriting unit 340 when the priority of the ToS bits is lower than the priority of the found application type or output the packets of the packet stream to the mapping circuit 140 when the priority of the ToS bits is equal to or higher than the priority of the found application type. The overwriting unit 340 is operable to overwrite the ToS bits according to the priority of the application type of the packet stream, or according to a predetermined priority if the application type of the packet stream is not yet found. The overwriting unit 340 is also operable to leave the ToS bits unchanged if the application type of the packet stream is not yet found. It should be noted that once an application type is found by the examining unit 310, the priority of such application type is decided by the examining unit 310. It should also be noted that if the overwriting operation is not required, the inspecting unit 320, the comparison unit 330 and the overwriting unit 340 could be optionally neglected. In addition, the mapping circuit 140 may distribute packets of the packet stream to one of a plurality of queues according to the application type of the packet stream, according to the ToS bits of these packets, or according to a prescribed rule before the application type is found and/or the ToS bits are set.

Figure 2:
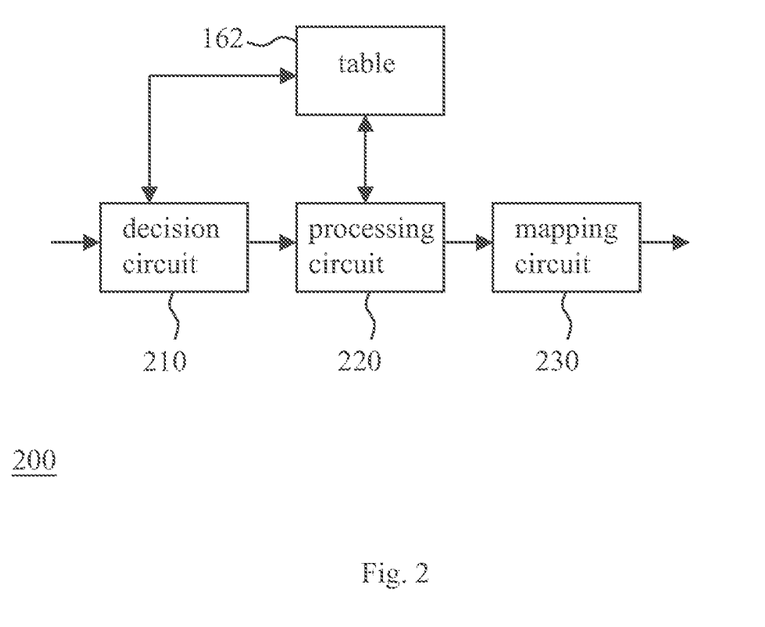
FIG. 2 illustrates an embodiment of the packet-forwarding priority setting circuit of the present disclosure.

In addition to the above-described packet forwarding device, the present disclosure also discloses a packet-forwarding priority setting circuit for setting the priority of a stream. An embodiment of the packet-forwarding priority setting circuit is illustrated in FIG. 2. According to FIG. 2, the priority setting circuit 200 comprises a decision circuit 210, a processing circuit 220 and a mapping circuit 230. An exemplary implementation of the decision circuit 210 is the decision circuit 120 of FIG. 1 or the equivalent thereof, and the decision circuit 210 is configured to detect whether an application type of a stream is included in a table (e.g., the table 162 of FIG. 1), in which the stream (hereafter "packet stream") includes packets or is composed of packets. An exemplary implementation of the processing circuit 220 is the processing circuit 130 of FIG. 1 or the equivalent thereof; the processing circuit 220 is configured to examine at least one preceding packet among the packets of the packet stream if the decision circuit 210 finds that the application type of the packet stream is not included in the table, so as to determine the application type of the packet stream and then store the application type of the packet stream in the table; and the processing circuit 220 is also configured to determine the application type of the packet stream according to the table if the decision circuit 210 finds that the application type of the packet stream is included in the table. An exemplary implementation of the mapping circuit 230 is the mapping circuit 140 of FIG. 1 or the equivalent thereof, and the mapping circuit 230 is configured to distribute some or all of the packets of the packet stream (e.g., all the packets of the packet stream, or all the packets of the packet stream except the at least one preceding packet) to one of a plurality of queues according to the application type of the packet stream, in which the queues are associated with different priorities respectively.

Since those of ordinary skill in the art can appreciate the detail and modification of the packet-forwarding priority setting circuit 200 by referring to the disclosure of the packet forwarding device 100, which means that the features of the packet forwarding device 100 can be applied to the packet-forwarding priority setting circuit 200 in a reasonable way, therefore repeated and redundant description is omitted provided that the written description and enablement requirements are still fulfilled.

Figure 4:
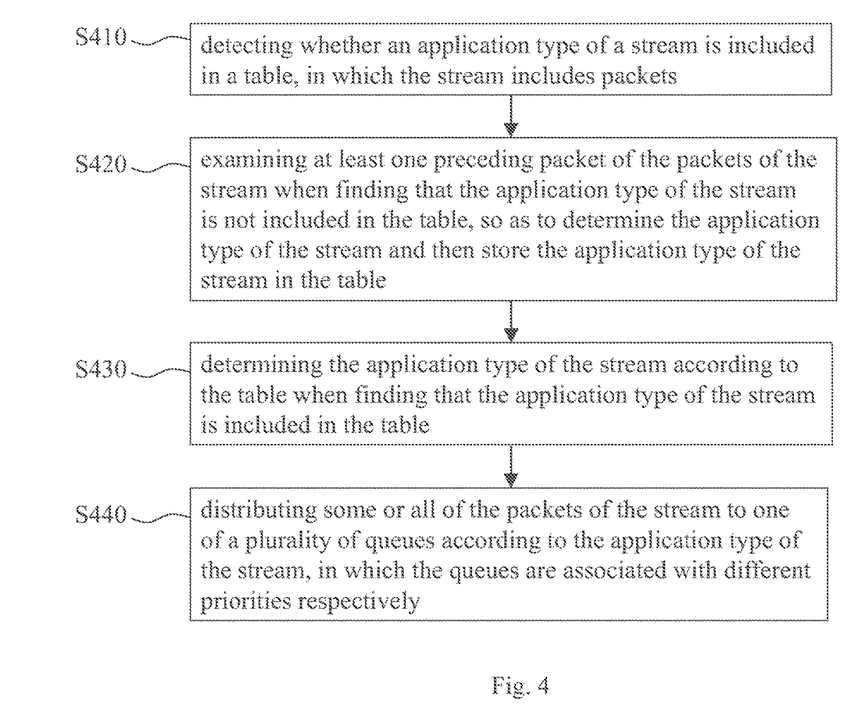
FIG. 4 illustrates an embodiment of the packet-forwarding priority setting method of the present disclosure.

The present disclosure further discloses a packet-forwarding priority setting method for setting the priority of a stream. An embodiment of the method is illustrated by the flow chart of FIG. 4, and comprises the following steps:

Step S410: detecting whether an application type of a stream is included in a table, in which the stream includes packets. This step can be carried out by the decision circuit 120 of FIG. 1 or the equivalent thereof.

Step S420: examining at least one preceding packet among the packets of the stream when finding that the application type of the stream is not included in the table, so as to determine the application type of the stream and then store the application type of the stream in the table. This step can be carried out by the processing circuit 130 of FIG. 1 or the equivalent thereof.

Step S430: determining the application type of the stream according to the table when finding that the application type of the stream is included in the table. This step can be carried out by the processing circuit 130 of FIG. 1 or the equivalent thereof.

Step S440: distributing some or all of the packets of the stream (e.g., all the packets of the stream, or all the packets of the stream except the at least one preceding packet) to one of a plurality of queues according to the application type of the stream, in which the queues are associated with different priorities respectively. This step can be carried out by the mapping circuit 140 of FIG. 1 or the equivalent thereof.

Since those of ordinary skill in the art can appreciate the detail and modification of the packet-forwarding priority setting method by referring to the disclosure of the packet forwarding device 100, which means that the features of the packet forwarding device 100 can be applied to the packet-forwarding priority setting method in a reasonable way, therefore repeated and redundant description is omitted provided that the written description and enablement requirements are still fulfilled.

In summary, the packet forwarding device, the packet-forwarding priority setting circuit and the packet-forwarding priority setting method of the present disclosure provides a way to implement the QoS feature for those unclassified packet streams, and can be realized in a simple, efficient and cost-effective manner. Furthermore, user experience can be enhanced through the invention of the present disclosure.

The aforementioned descriptions represent merely the preferred embodiments of the present disclosure, without any intention to limit the scope of the present disclosure thereto. Various equivalent changes, alterations, or modifications based on the claims of the present disclosure are all consequently viewed as being embraced by the scope of the present disclosure.

What is claimed is:

1. A packet forwarding device, comprising:
   a reception circuit configured to receive packets of a stream;
   a decision circuit configured to detect whether an application type of the stream is included in a table;
   a processing circuit configured to examine at least one preceding packet among the packets of the stream according to at least one predetermined keyword and/or at least one predetermined data pattern, after the decision circuit finds that the application type of the stream is not included in the table, so as to determine the application type of the stream and then store the application type of the stream in the table; the processing circuit configured to determine the application type of the stream according to the table after the decision circuit finds that the application type of the stream is included in the table; and the processing circuit configured to overwrite bits of type of service (ToS) of some or all of the packets of the stream after determining the application type of the stream;
   a mapping circuit configured to distribute some or all of the packets of the stream to one of a plurality of queues according to the application type of the stream, in which the queues are associated with different priorities respectively; and
   a transmission circuit configured to output packets in the queues according to the priorities.

2. The packet forwarding device of claim 1, wherein the packets of the stream are received wirelessly and/or outputted wirelessly.

3. The packet forwarding device of claim 1, wherein the decision circuit compares header information of the at least one preceding packet with packet information in the table to detect whether the application type of the stream is included in the table.

4. The packet forwarding device of claim 3, wherein both the header information of the at least one preceding packet and the packet information in the table include address and port information.

5. The packet forwarding device of claim 1, wherein the packet forwarding device stores the application type of the stream and header information related to the stream in the table.

6. The packet forwarding device of claim 1, wherein the queues are associated with Wi-Fi Multimedia's (WMM's) four Access Categories respectively.

7. A packet-forwarding priority setting circuit, comprising:
   a decision circuit configured to detect whether an application type of a stream is included in a table, in which the stream includes packets;
   a processing circuit configured to examine at least one preceding packet among the packets of the stream according to at least one predetermined keyword and/or at least one predetermined data pattern, after the decision circuit finds that the application type of the stream is not included in the table, so as to determine the application type of the stream and then store the application type of the stream in the table; the processing circuit configured to determine the application type of the stream according to the table after the decision circuit finds that the application type of the stream is included in the table; and the processing circuit configured to overwrite bits of type of service (ToS) of some or all of the packets of the stream after determining the application type of the stream.

8. The packet-forwarding priority setting circuit of claim 7, further comprising:
   a mapping circuit configured to distribute some or all of the packets of the stream to one of a plurality of queues according to the application type of the stream, in which the queues are associated with different priorities respectively.

9. The packet-forwarding priority setting circuit of claim 7, wherein the decision circuit compares address and port information of the at least one preceding packet with address and port information in the table to detect whether the application type of the stream is included in the table.

10. The packet-forwarding priority setting circuit of claim 7, wherein the packet-forwarding priority setting circuit stores the application type of the stream and address and port information related to the stream in the table.

11. A packet-forwarding priority setting method, comprising the following steps:
    detecting whether an application type of a stream is included in a table, in which the stream includes packets;
    examining at least one preceding packet among the packets of the stream according to at least one predetermined keyword and/or at least one predetermined data pattern when finding that the application type of the stream is not included in the table, so as to determine the application type of the stream and then store the application type of the stream in the table;
    determining the application type of the stream according to the table when finding that the application type of the stream is included in the table;
    overwriting bits of type of service (ToS) of some or all of the packets of the stream after determining the application type of the stream; and
    distributing some or all of the packets of the stream to one of a plurality of queues according to the application type of the stream, in which the queues are associated with different priorities respectively.

12. The packet-forwarding priority setting method of claim 11, wherein the step of detecting whether the application type of the stream is included in the table includes: comparing header information of the at least one preceding packet with packet information in the table to detect whether the application type of the stream is included in the table.

13. The packet-forwarding priority setting method of claim 12, wherein both the header information of the at least one preceding packet and the packet information in the table include address and port information.

14. The packet-forwarding priority setting method of claim 11, wherein the step of examining the at least one preceding packet includes: storing header information of the at least one preceding packet in the table.

15. The packet-forwarding priority setting method of claim 11, wherein the queues are associated with four categories of voice, video, best effort and background respectively.

* * * * *